United States Patent [19]
Walker

[11] Patent Number: 5,161,814
[45] Date of Patent: Nov. 10, 1992

[54] TRAILERABLE STRUCTURE WITH RETRACTABLE SUSPENSION

[76] Inventor: Douglas W. Walker, 550 E. 34th St., Durango, Colo. 81301

[21] Appl. No.: 659,541

[22] Filed: Dec. 20, 1990

Related U.S. Application Data

[63] Continuation of Ser. No. 344,658, Apr. 28, 1989, abandoned.

[51] Int. Cl.⁵ .............................................. B62D 63/08
[52] U.S. Cl. ........................... 280/414.5; 280/43.24; 280/63; 280/414.1; 280/656; 280/763.1
[58] Field of Search .............. 280/414.1, 414.5, 405.1, 280/43.22, 43.23, 43.24, 63, 641, 656, 763.1

[56] References Cited

U.S. PATENT DOCUMENTS

| | | | |
|---|---|---|---|
| 2,806,710 | 9/1957 | Mascaro | 280/414.5 |
| 2,827,187 | 3/1958 | Elmore | 280/414.1 |
| 2,834,599 | 5/1958 | Sarchett | 280/415.1 |
| 2,882,064 | 4/1959 | Morrison | 280/414.1 |
| 2,969,989 | 1/1961 | Struthers | 280/43.11 |
| 2,990,966 | 7/1961 | Schramm | 414/476 |
| 3,179,438 | 4/1965 | Field | 280/43.14 |
| 3,377,080 | 4/1968 | Bartley et al. | 280/43.23 |
| 3,434,732 | 3/1969 | Heldenbrand | 280/43.17 |
| 3,523,698 | 8/1970 | Bishop | 280/766.1 |
| 3,795,336 | 3/1974 | Acker et al. | 280/43.23 |
| 3,832,932 | 9/1974 | Even | 280/43.23 |
| 3,834,111 | 9/1974 | Acker et al. | 414/786 |
| 4,003,583 | 1/1977 | Stanzel | 280/43.22 |
| 4,008,902 | 2/1977 | Dill | 280/43.23 |
| 4,126,324 | 11/1978 | Browning | 280/656 |
| 4,175,768 | 11/1979 | Thackray | 280/491.2 |
| 4,366,650 | 1/1983 | Patterson | 280/43.24 |
| 4,807,894 | 2/1989 | Walker | 280/656 |

FOREIGN PATENT DOCUMENTS

| | | | |
|---|---|---|---|
| 2919341 | 11/1979 | Fed. Rep. of Germany | 280/656 |
| 2194925 | 3/1988 | United Kingdom | 280/763.1 |

*Primary Examiner*—Mitchell J. Hill
*Attorney, Agent, or Firm*—Kenton L. Freudenberg; Maxwell C. Freudenberg

[57] ABSTRACT

A simple trailer frame is provided which may be included within a structure and which allows the frame or the structure to be easily and quickly converted into a mobile trailer on retractable wheel assemblies. When the frame is used within a structure, once the structure is at its use site it need show very little evidence that it was a trailer. Also included in the frame is a towing member receiving member for quick and easy attachment and detachment of a towing member to the frame. A mechanical linkage is provided within the frame so that proper connection of the towing member to the frame locks the extended wheel assemblies in place. Towing is only possible when wheels are properly extended and locked. As a safety precaution, the design may also include a provision so that the locking mechanism cannot be deactivated unless the weight of the frame has been removed from the wheel assemblies. Self-contained lifting and lowering components such as jacks, may also be included as an integral part of the frame or the structure.

18 Claims, 5 Drawing Sheets

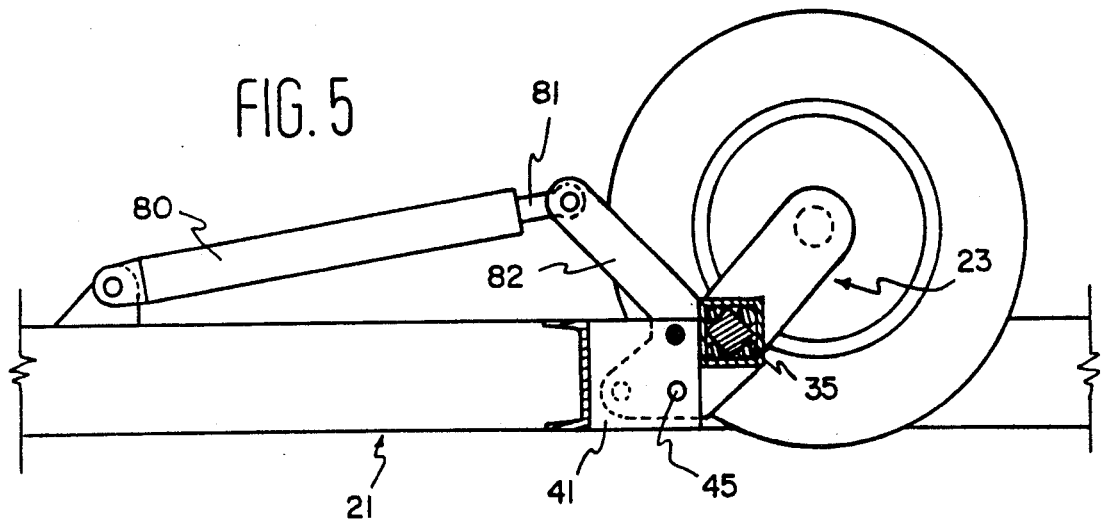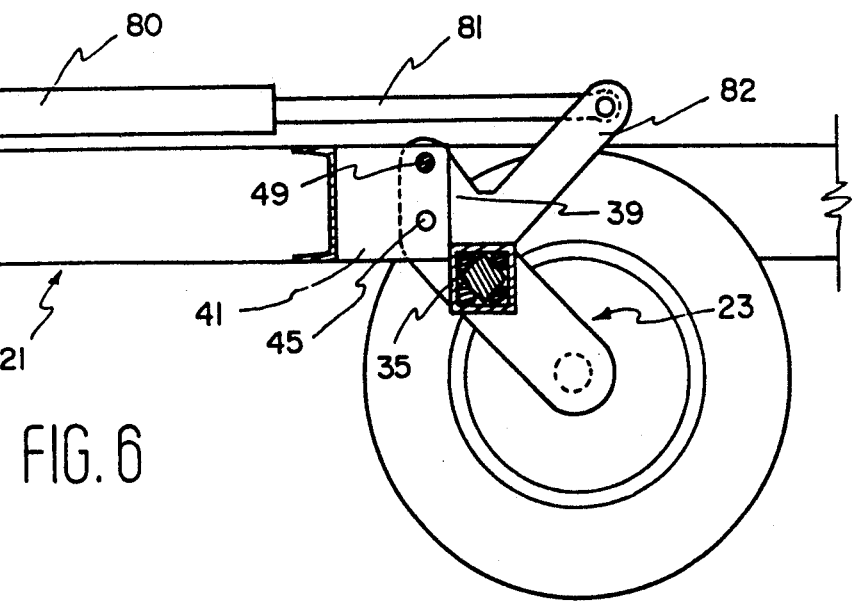

TRAILERABLE STRUCTURE WITH RETRACTABLE SUSPENSION

This is a continuation of application Ser. No. 7/344,658, filed Apr. 28, 1989, abandoned upon the filing of this application.

BACKGROUND OF INVENTION a. Field of Invention

The present invention relates to trailerable structures with transporting features. More specifically, the present invention relates to an improved frame, which may be included within a structure, which frame or structure is capable of being a towable trailer system and has a retractable wheel and suspension system which is easily and safely locked and unlocked in the extended position by the positioning of a detachable towing member.

b. Discussion of Prior Art

Heretofore, most movable structures have required loading or mounting on separate wheeled carriers, such as trailers, for transportation. When such structures are large or heavy, loading and unloading them from a trailer frequently requires the use of hoists, lifts or ramps, all of which may present special safety risks and require expensive equipment. The frames of structures which are frequently loaded on to and removed from trailers usually have design or reinforcement features which allow them to withstand the stresses of being hoisted, loaded, and unloaded. Such design and reinforcement features may add to the cost of such structures. Also, it is often necessary to design and construct expensive custom trailers to transport structures which are large or have unusual shapes. After a structure is unloaded from a trailer, storage of the trailer may be a problem.

The disadvantages of using separate trailers to transport structures have led to some other attempted solutions. Many structures have been designed as trailers with wheels permanently affixed to them. When moved, such permanently wheeled structures are used with the trailer's wheels and other components in place. This may be detrimental to the intended use of the structure at its use site, as the exposed wheels, fenders, and towing member may have an adverse affect on its appearance. This may be especially detrimental when the structure is intended for use, for example, in making sales or for use at a social function. Furthermore, structures permanently mounted on wheels are usually raised significantly above the ground level, thus creating a safety hazard for people entering and leaving the structures. Additionally, because of their mobility, structures on wheels are easily subject to theft.

Another solution to this problem has been to build trailers with retractable wheels, for example as shown in Even, et al. U.S. Pat. No. 3,832,932. The system of this reference is designed for a rocket launching trailer which includes a chassis which is pivotally carried by a turret having feet adapted to be lowered to the ground surface, this lowering being associated with the raising of the wheels above the ground by jacks between the chassis and the wheels. The turret feet are separately adjustable to provide a stable base for the rocket launcher. While this design does provide stability to the structure when it is used, the appearance, the complexity, and the cost of manufacture are disadvantages to this prior art structure for most domestic applications to trailerable structures.

Another trailer system is taught in Patterson, U.S. Pat. No. 4,366,650. The design of the structure of this reference allows a drilling system to be moved between drilling sites. At the use site the wheels are lifted from the ground and stored in the structure, to allow part of the structure to be lowered to the ground while the remainder of the structure is suspended considerably above the ground. While this arrangement may work well for a drilling rig, it does not solve the portability problems of most domestic structures. For example, the working platform structure does not lower to ground level, the system is not attractive, and no provisions are indicated to insure the safety of the operation. Field U.S. Pat. No. 3,179,438 discloses a toggle actuated caster wheel system which would not work for structures to be trailered or for structures other than light weight carts.

Several references have been found which address trailer systems having removable components. These systems have several disadvantages. Removed components must be handled and stored and the maximum width of the structures themselves is often compromised by the extension of wheel assemblies.

Additionally, Century Industries Inc. of Sellerburg, Ind. is known to have advertised a trailerable structure which has wheel wells and wheels which are retractable into such wells at the use site. However, it is understood that an air suspension system is used to retract and extend the wheels which could fail catastrophically if an air leak should occur. Also, no failsafe system is known to exist which could preclude the retraction of the wheels while in the trailering mode.

It is therefore seen that none of the known prior art provides a simple and inexpensive trailer frame which may be included within a structure and which allows for a retractable wheel and suspension system which is safely locked in position by the simple placement of a towing member.

SUMMARY OF THE INVENTION

Therefore, it is an object of the present invention to provide a simple and inexpensive trailer frame which may be included within a structure, and which allows the frame or the structure to be easily, quickly and safely converted into a trailer without the need for tools; and which, when included within a structure, will show very little evidence that it was a trailer, once it is at its use site.

It is another object of the present invention to provide a relatively inexpensive system which allows various types of otherwise static structures which include the frame assembly of the present invention to be made mobile on retractable wheel assemblies.

It is yet another object of the present invention to provide a safe locking mechanism which cannot be disengaged while the trailer frame is capable of being towed or has weight being transferred to the frame by way of the wheels and suspension.

In accordance with the present invention, a trailerable support and carrying frame is provided which may be designed and positioned within a structure in a manner to make the entire structure trailerable. The frame includes a transverse member which pivotally supports a suspension member parallel to the transverse frame member. The suspension member is so constructed as to contain a torsion suspension which is rotationally connected to a wheel at each end by means of torsion arms and stub axles. The pivotal attachment of the axle to the transverse member allows the suspension and wheels to be retracted above the base of the frame thus permitting the frame to rest on the ground or other surface and also allows the suspension and wheels to be extended to support the frame which allows the frame to be trailered. Also included in the frame structure is a towing member receiving member for the quick and easy attachment and detachment of a towing member to the frame. Locking and unlocking of the suspension to the transverse member is controlled by a mechanical linkage which is in turn controlled by the placement of the removable towing member. In preferred embodiments the trailerable frame or structure may also include built-in jacks.

As a safety precaution, the design may also include a provision such that the towing member cannot be secured to the structure unless the suspension pivots are fully and properly locked to the frame and also a provision such that the locking mechanism cannot be disengaged while the wheels are supporting any of the weight of the frame or structure.

In operation, an otherwise static structure which includes an integral support and carrying frame having retracted suspension and wheels and a towing member receiving member, according to the present invention, is raised by jacks to a suitable height to allow the retracted wheels to lower into the locking position. The towing member is subsequently connected to the towing member receiving member which automatically locks the wheels in the lowered position. Then the jacks are retracted, causing the wheels to be placed in contact with the ground so that the structure can be easily trailered by connecting the towing member to a towing vehicle in the conventional manner.

At the site of use, the structure is again raised on jacks to a height which removes weight from the suspension and wheels. The towing member is then removed which allows for the manual unlocking of the suspension. As the jacks again lower the structure to the ground, or other support surface the wheels automatically retract into the structure.

The structure which has been so moved now looks and performs substantially as if it had never been a part of a trailer. The detached towing member is relatively small and is therefore easily stored. By the use of the trailerable structure of the present invention a system is provided which can be quickly and easily operated by an individual without the need for any special tools, and without the need for separate trailers, trucks, lifts, and hoists.

The present invention has many additional advantages. It allows otherwise static structures to be designed or adapted to accept the support and carrying frame of the present invention. For use in a rental business, a storage unit may be used as a trailer. Also, structures which, according to the present invention, include vertical lift jacks can be leveled at their site of use by selective deployment of such jacks.

It is therefore seen that the present invention improves the safety, appearance, mobility, economy, efficiency, and functionability of a wide variety of trailerable structures.

For a fuller understanding of the nature and objects of the present invention, reference should be made to the following detailed description taken in conjunction with the accompanying drawings.

BRIEF DESCRIPTION OF THE DRAWINGS

The accompanying drawings illustrate complete preferred embodiments of the present invention according to the best modes presently conceived for the practical application of the principles thereof, and in which:

FIG. 5 is a section of a wheel suspension or axle member of an alternative embodiment showing a jack mechanism connected thereto for retracting a wheel assembly to a position corresponding to FIG. 3.

FIG. 6 is a section of a wheel suspension or axle member of the alternative embodiment of FIG. 5, but showing the jack mechanism connected thereto for extending a wheel assembly to a trailering position corresponding to FIG. 3.

DESCRIPTION OF THE PREFERRED EMBODIMENTS

With reference to the drawings of FIGS. 1,2,3, and 4 and by way of example, one embodiment of the present invention emcompasses a rectilinear structure 17 with wheel wells 19 for use, for example, as small towable two-wheeled trailer built upon support frame 21.

Figure 1:
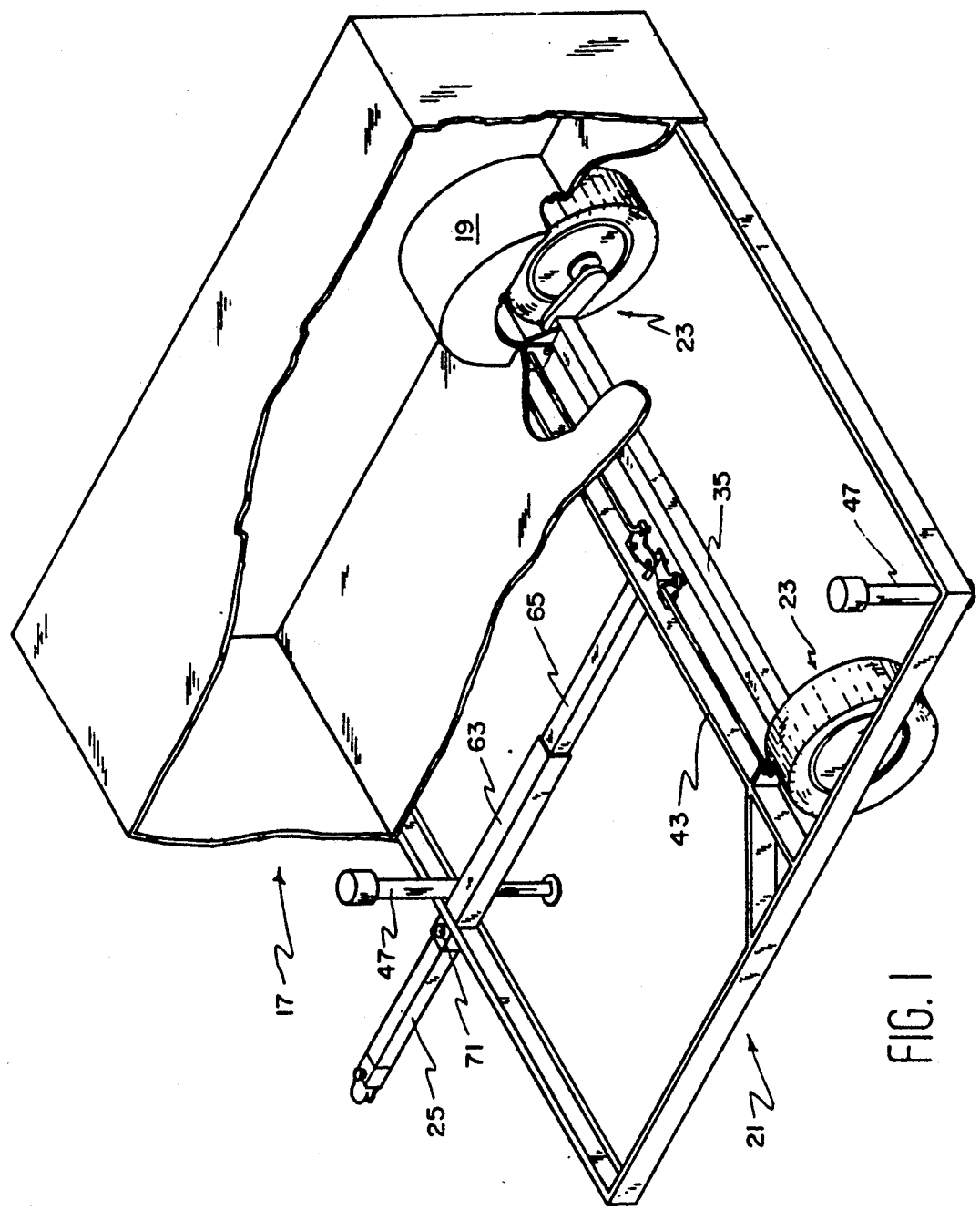
FIG. 1 is an isometric view with fragmentary sections of one embodiment of a frame for a trailerable structure with retractable wheels with the suspension extended and locked.

Trailering components such as wheel suspension assemblies 23 and a towing member 25 are attached to frame 21. FIG. 1 indicates the relative position of these components when they are in use in this embodiment with the towing member in its towing position which it must assume before towing forces are applied from a towing vehicle to move the trailer over a road surface. As detailed below, the towing member 25 is designed and constructed of a size and shape to fit within a receptacle 63 in a receiving means in the frame 21 for quick and easy attachment to and detachment from from frame 21 by an individual without the need for tools. Furthermore, it will be shown that the attachment and detachment of the towing member 25 relative to its towing position allows for the respective locking of the extended wheel suspension assemblies 23 when the towing member is in its towing position and for the manually operated release of the locking means and retraction of the wheel suspension assemblies 23 when the towing member is moved from its towing position.

Figure 2:
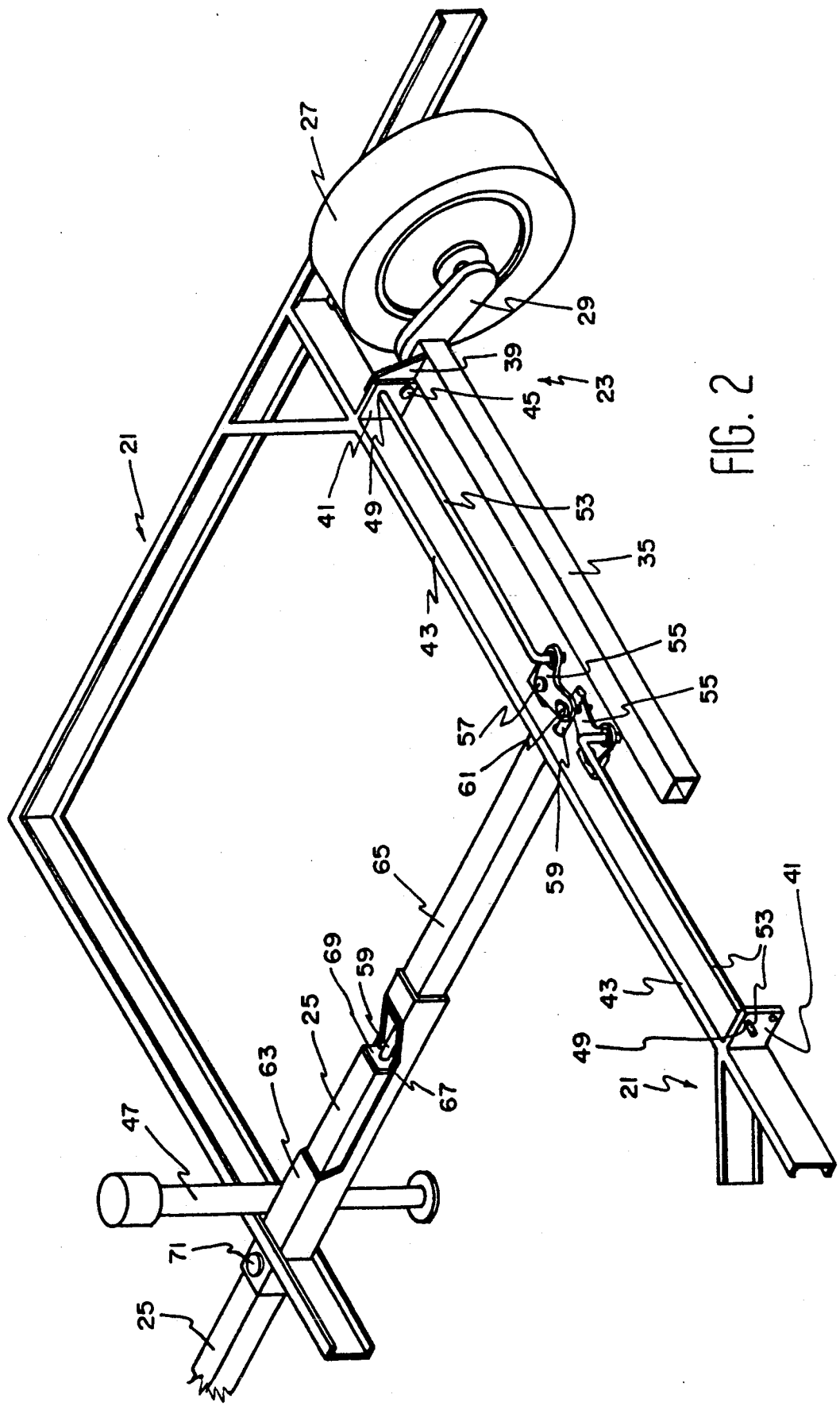
FIG. 2 is an enlarged partially fragmentary isometric view of FIG. 1.
Figure 3:
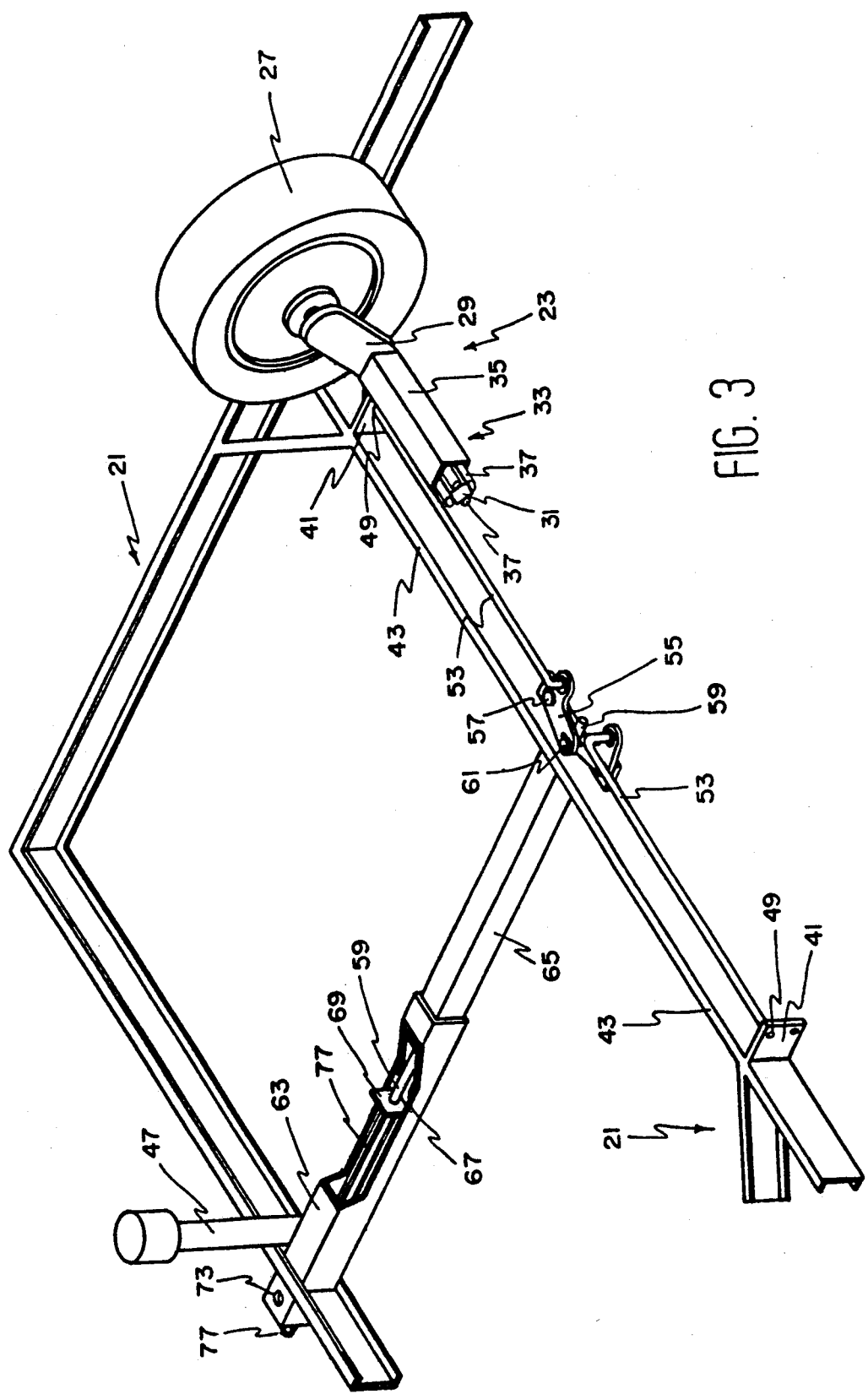
FIG. 3 is an enlarged partially fragmentary isometric view of the structure in FIG. 1 with the suspension unlocked and retracted.
Figure 4:
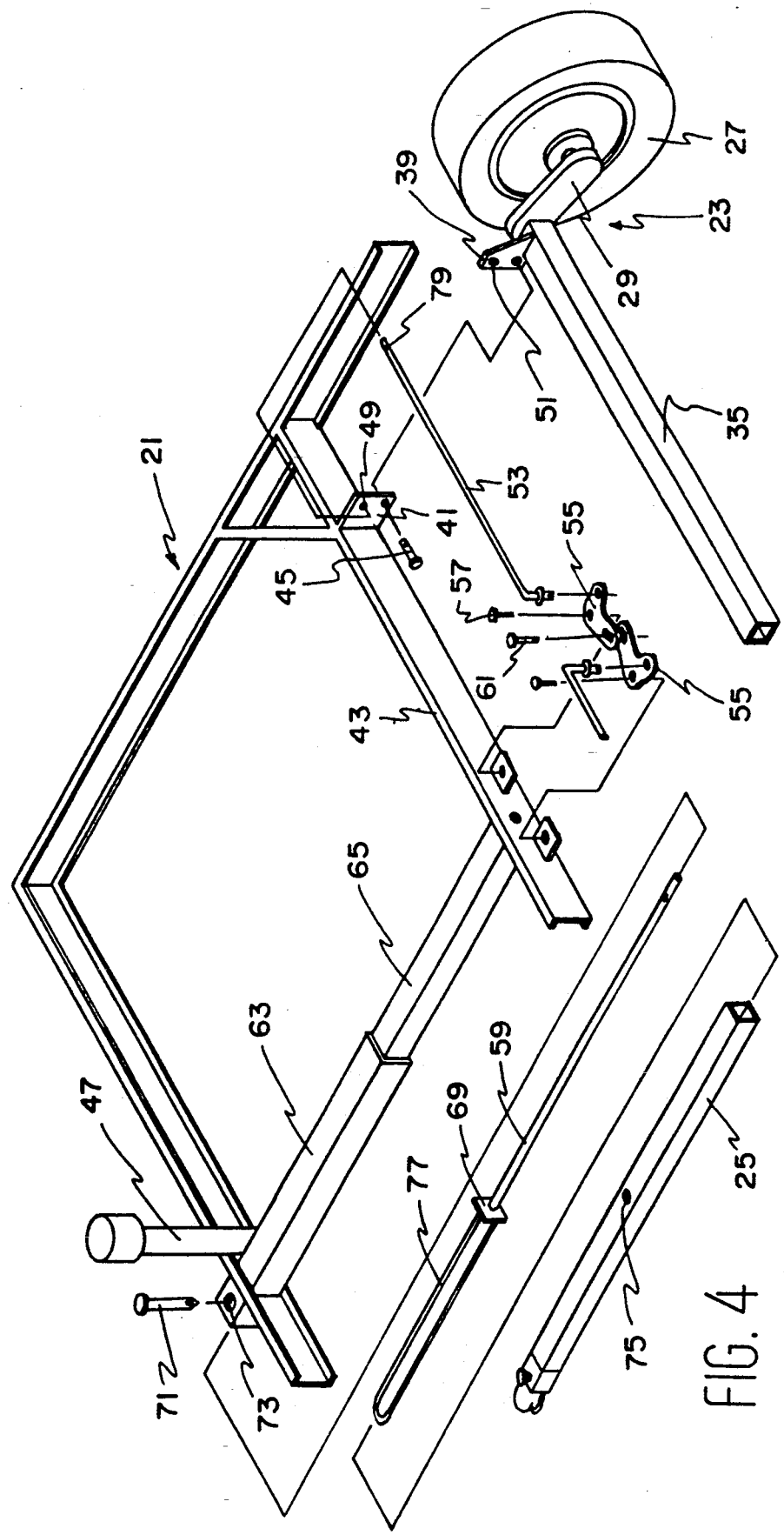
FIG. 4 is an enlarged isometric partially fragmentary exploded view of the structure in FIG. 1.

A significant sub-assembly component of the present invention is wheel suspension assembly 23, which is shown in substantial detail in FIGS. 2,3, and 4. Wheel suspension assembly 23 is comprised of wheel 27 which is rotably mounted on an axle which is attached to torsion arm 29. Torsion arm 29 is in turn attached to spring means in the form of an angled torsion bar 31 as shown in FIG. 3. Torsion bar 31 is a component of a standard, resiliently mounted, torsion suspension spring assembly 33.

To better understand the torsion suspension assembly 33, FIG. 3 has been partially cut away to detail its structure and operation. The angled torsion bar 31, in this case having a square cross-section, is resiliently secured within an angled, in this case again a square cross-section, suspenstion member 35 by means of a plurality of resilient cords 37. Resilient cords 37 limit the rotation of torsion bar 31 within suspension member 35. When in use, suspension member 35 is non-rotatably locked to frame 21. As a vertical load is applied to frame 21, resilient cords 37 are compressed, and the load is in turn transmitted to wheel 27 via torsion bar 31 and torsion arm 29. When the system is being towed this compressive characteristic of resilient cords 37 serves to absorb road shock energy and to dampen oscillations.

With the wheel suspension assembly 23 in the extended position as shown in FIG. 2, the torsion arm 29 extends downward and aft of the suspension member 35. This allows vertical bouncing and road bumps to be absorbed as rotative motion of the torsion bar 31. Furthermore, when the retention system is unlocked, the position of the torsion arm 29 allows upward pressure from the ground or other supporting surface to rotate the wheel suspension assembly 23 into its retracted position within a portion of the trailer such as frame 21 or wheel well 19.

Once in the retracted possition, the torsion arm 29 still is extended aft of the suspension member which maintains the center of gravity of the wheel suspension assembly 27 aft of its pivotal point of attachment to the frame 21. This allows gravity to automatically extend the wheel suspension assembly 27 as the frame 21 is lifted above the ground or other surface. Details of the attachment of the wheel suspension assemblies 23 are shown in FIGS. 2 and 4 and discussed below.

The suspension member 35 is part of a movable support means for mounting the wheel assembly for movement on the frame 21 between an extended towing position and a retracted position which permits the frame to rest on a supporting surface. The member 35 is connected to frame 21 by means of suspension flange 39 which is affixed to suspension member 35 and a structure including a frame flange 41 which is affixed to frame cross member 43. Suspension flange 39 and frame flange 41 have flat surfaces which abut each other face to face and are pivotally attached to each other by flange pin 45 extending through registering pivot holes therein. Flange pin 45 is retained by a cotter which is not shown. Frame flange 41 is so designed that when frame 21 is raised by jacks 47 and wheel suspension assembly 23 pivots downward by the force of gravity, suspension member 35 contacts frame flange locking 41 at the point when frame flange hole 49 is aligned with suspension flange locking hole 51. Alignment of these holes allows the insertion of locking rod 53 and resultant locking of wheel suspension assemblies 23 through the registering locking holes in the extended position. Thus the jacks form a power means to raise or lower the trailer frame to effect relative movement between the frame and wheel assemblies as the latter drop or are pushed up by the supporting surface when the wheel assemblies are unlocked.

A simple fail-safe system controls the actuation means for locking and unlocking of the wheel suspension assemblies 23. The wheel assembly locking means comprise the locking rods 53 together with the flanges 39 and 41 which are locked together when the rods are moved to enter both holes 49 and 51 in the flanges 39 and 41 of the wheel assemblies. Actuation means for the wheel assembly locking means comprises the bell cranks 55 carried by the frame cross member 43 with one end of each crank connected to a respective locking rod 53. The other ends of the bell cranks 55 are movable by interconnecting means comprising the push/pull rod 59 and flange 69 thereon for interconnecting the bell cranks to the towing member 25 when the latter engages the flange 69 to push the latter toward the rear of the trailer to activate the wheel assembly locking means. The wheel assembly locking means may be deactivated by manually actuatable means comprising the mechanical control loop member 77 which may be pulled to selectably move the cranks 55 via the same interconnecting means comprising the rod 59. Manual operation of the loop 77 to unlock the locking means is prevented until the towing member 25 is moved away from its towing position to expose the loop 77 whereupon the loop may be selectably operated by the user when conditions at the trailer are deemed to be safe for such operation. Thus, the towing member which covers the loop 77 and engages the flange 69 when the towing member 25 is in its towing position provides means for preventing manual pulling operation of the loop 77 to prevent unlocking of the wheel assembly locking means. The positioning of each locking rod 53 is controlled by bell crank 55 which pivots about crank pin 57. In turn, the position of bell crank 55 is determined by the position of push rod 59. Translative motion of push rod 59 is transferred to pivotal motion of bell crank 55 by means of push rod pin 61. The push rod 59 is protectively located within towing member receiving member 63 and within receiving member extension 65. The receiving member extension 65 is so designed and constructed as to intersect frame cross member 43 at one end while the other end is telescoped into the towing member receiving member 63. The telescoped end of receiving member extension then serves as positioning stop 67. The towing member is interconnected to operate the push rod 59 by means of a push rod flange 69. The push rod flange 69 is attached to the leading end of push rod 59 and is so designed as to be a sliding fit within towing member receiving member 63 but is stopped by positioning stop 67. After the wheels are moved to their extended positions the towing member, in moving to its towing position by sliding movement in receiving member 63, connects with the push rod flange to move it against positioning stop 67, the locking rod 53 is inserted into suspension flange hole 51 and the wheel suspension assembly 23 is retained in the extended position. In preferred embodiments, towing member 25 is removably telescoped into towing member receiving member 63. The push rod flange 69 is pushed toward and locked against the positioning stop 67 by the installation of the towing member 25 and the subsequent insertion of retaining pin 71. Retaining pin 71 provides a locking means which makes a releasable connection for towing between the towing member and its receiving means and is inserted into towing member receiving member hole 73 and towing member hole 75. The position of these holes is designed and constructed such that towing member 25 holds push rod flange 69 against positioning stop 67 when retaining pin 71 is in place. Retaining pin 71 is itself retained by a hairpin cotter which is not shown. The locking means which retains the towing member 25 by engagement of pin 71 in the receiving member hole 73 and the towing member hole 75 is effectively disabled by means of the mechanical linkages extending all the way from the towing member to the locking rods 53 which lock the wheel assemblies in their extended towing positions only when the holes 49 and 51, in flanges 41 and 39, are aligned to receive the rods 53. When the rods 53 cannot enter both of these holes due to the wheel assemblies being in positions other than their fully extended positions the various mechanical linkages including the bell cranks 55, push rod 59 and its flange 69 are kept in positions such that the towing member is prevented by flange 69 from being inserted far enough into the receiving member to permit alignment of holes 73 and 75, thus preventing insertion of the locking pin 71.

Also, in this embodiment, a manually actuatable means for selectably releasing the locking system for the wheel assemblies when conditions are safe to do so, at any time after removal of the towing member 25, is provided by a loop 77. The rigid loop 77 is attached to push rod flange 69 and extends to the opening of towing member receiving member 63. When the towing member 25 is installed, "the manually operated apparatus comprising the pull loop 77 telescopes within the hollow towing member 25 a non-towing position to provide access to the loop 77. Upon the removal of towing member 25, manually pulling or operating the control loop 77 forward is effected at any time selected by the operator to be safe after the towing member is unlocked from its towing position and moved away from the towing position whereby the operator selectively deactivates the wheel assembly locking system. The manually operated control loop is located at the front center of the periphery of the generally rectangular trailer frame 21 which extends horizontally beyond the area of the wheel assemblies.

While FIGS. 2,3, and 4 illustrate only one wheel suspension assembly 23, a second, mirror image wheel suspension assembly 23 is attached to frame 21 and retained in the same manner as shown and described for the first wheel suspension assembly.

Several fail-safe features are incorporated in the structure of the present invention. As previously described, insertion of towing member 25 into receptacle 59 causes the simultaneous, retention of both wheel suspension 23 the extended position. However, as a safety measure, solid portions of suspension flange 39 prevent insertion of locking rod 53 into suspension flange locking hole 51 if wheel suspension 23 is not fully extended and properly positioned. When locking rod 53 is held back by suspension flange 39, full insertion of push rod 39 and towing member 25 is prevented. Consequently, holes 73 and 75 cannot be aligned and towing member retaining pin 71 cannot be installed. Of course, towing of frame 21 is not feasible unless towing member 35 is retained, thus structure 21 cannot be towed unless wheel suspension assemblies 23 are properly positioned so that the locking holes 49 and 51 are in registry and retained.

As an additional safety feature, a notch 79 is located on locking rod 53 at its point of contact with suspension flange 39 such that withdrawal of locking rod 53 is prevented while the wheel suspension assembly 23 is supporting the frame 21. Specifically, when the wheel suspension assembly 23 is supporting the frame 21, the assembly 23 is rotated about flange pin 45 until the aft side of suspension flange hole 51 engages the notch on the aft side of locking rod 53 thereby slightly offsetting holes 49 and 51 thereby preventing the withdrawal of locking rod 53. When the frame 21 is raised so that wheel suspension assemblies 23 are not supporting frame 21, the force of gravity rotates the wheel suspension assemblies 23 about flange pin 45 until suspension member 35 contacts frame flange 41 at which point locking holes 49 and 51 allign so that there is no shearing force on the locking rod 53 and locking rod 53 can be withdrawn by removing towing member 25 and pulling on loop 77.

To facilitate the retraction and extension of wheel suspension assemblies 23, jacks 47 are built into frame 21. FIGS. 1 thru 2 show built-in conventional jacks. When wheel suspension assemblies 23 are to be retracted, jacks 47 are activated and lowered sufficiently to allow the weight of frame 21 to be removed from wheel suspension assemblies 23. After retraction release of the locking means to permit of wheel suspension assemblies 23, jacks 47 can be reversed to lower frame 21 to the ground or other support surface. If needed, jacks 47 can also be used for leveling frame 21. Jacks 47 are used in a similar manner to re-extend the wheel suspension assemblies 23.

To summarize the operation of the embodiment of the present invention as thus far presented, the following would be normal operational sequence for structure 17 which is built upon frame 21. Structure 17 as shown in FIG. 1 with all wheel suspension assemblies 23 extended and locked, towing member 25 attached, and all jacks 47 retracted, is towed to site of use with towing member 25 coupled to a towing vehicle, not shown. At the site of use, jacks 47 raise frame 21 and it is uncoupled from tow vehicle. Towing member retaining pin 71, and towing member 25 are next removed by hand. This allows the subsequently elected manual release of the locking system. Unlocking loop 77 is simply pulled forward which deactivates the actuating means for the suspension locking system by moving rod 59 forward and causing bell cranks 55 to pivot, thereby causing locking rods 53 to be retracted from suspension flange hole 51 as shown in FIG. 3. Frame 21 is then lowered on, and leveled if necessary, by its jacks 47. The wheel suspension assemblies 23 are automatically retracted into the structure wheel wells 19 as frame is lowered to the ground or other surface. Structure 17 is then ready for use in a manner and with an appearance which may not suggest that it was ever a part of a trailer.

Preparing the structure for transit is substantially a reverse operation in which, structure 17 is raised on its jacks 47. Wheel suspension assemblies 23 are automatically extended by gravity until suspension member 35 contacts frame flange 41. Towing member 25 is then manually inserted into towing member receiving member receptacle 63 until push rod flange 69 is moved thereby and contacts positioning stop 67. This locks the wheel suspension assemblies 23 in the extended position via the actuating means therefore which includes the bell cranks 55 which cause the locking rods 53 to be inserted through retaining holes 51. Manual insertion of towing member retaining pin 71 and its hairpin cotter locks the towing member in place and positively secures the retention or locking system, thereby securing wheel suspension assemblies 23 to frame 21 in their operating trailering position. Towing member 27 is then attached to a tow vehicle, jacks 47 are retracted, and structure 17 is ready for towing. This procedure is accomplished easily, quickly, and safely by hand and without the need for tools.

OTHER EMBODIMENTS

Another embodiment of the present invention incorporates the raising and lowering of structure 17 by the rotation of wheel suspension assemblies 23 relative to the trailer frame about flange pivot pins 45. In this embodiment, a jack mechanism is attached at its other end to apply a selectably controlled force between the frame and a bell crank 82 which is attached to suspension member 35. Actuation of the jack mechanism portion 81 in one direction retracts the unlocked wheel suspension assemblies 23 by applying or controlled force which directly lowers structure 17 to the ground. Reversal of the actuation of the jack mechanism, extends the wheel suspension assemblies relative to the frame and raises structure 17 to the trailering position. Locking of the extended wheel suspension assemblies 23 is like the locking mechanism in the preferred embodiment but the locking rod notch 79 is not used. A front jack 47 may also be incorporated to aid in coupling and uncoupling structure 17 to a tow vehicle.

Thus it can be seen that the trailering system of the invention porvides a quick, simple, safe, attractive, and economical means to move structures. Many other variations are possible. For example, structures fitted with several sets of frame cross members 43 can be retractably fitted with several sets of wheel suspension assemblies 23. Wheel wells 19 and jacks 47 can be inconspicuously built into cabinets or furniture when interior appearance is a concern. Wheel wells 19 and jacks 47 need not be noticeable at all from the exterior of structure 17.

Often moved structures such as sales offices, sales booths, display booths, portable telephone booths, ticket booths, portable toilets, wedding arbors, theatrical stages, podiums, gazebos, bandstands, food service stands, portable bars, spas and hot tubs, guard stations, recreational campers, and storage buildings, would all be significantly improved by incorporation of the present invention. Other types of structures could also use the retractable wheel suspension system according to the invention. For example, holding tanks and storage tanks could be used like stationary tanks and yet be easily mobile. These structures could all be easily portable as they could be towed like conventional trailers. However, at the site of use, these structures could appear to be permanently installed structures since all of the trailer components could be concealed and the floor level of the structures, when static, would be approximately at ground level. This improved appearance is important to the functional use of many of these structures. The safety of entering and exiting these structures would be improved by maintaining them at ground level, thereby eliminating the climb up and down from structures mounted on trailers, trucks or stationary wheels. The safety problems and expense of hoisting or lifting structures onto trailers or trucks, and of building structures so that they can be hoisted or lifted are also greatly improved by the present invention. Theft would also be minimized as once they are at their use sites the structures are not on wheels ready to be rolled away.

The safety of operation is also very significant. The present invention allows for a simple mechanical linkage to lock the structure suspension in an extended position. In the manner this linkage is coupled to the towing member, an operator cannot inadvertently neglect to lock the suspension when towing the structure. To further increase safety, the invention allows for a design in which the locking components are protected from damage by the structure's frame.

The present invention, therefore, allows improved safety, ease of operation, appearance, and utility of many types of structures.

While the invention has been particularly shown and described with reference to preferred embodiments thereof, it will be understood by those skilled in the art that the foregoing and other modifications or changes in form and detail may be made therein without departing from the spirit and scope of the invention as claimed, except as precluded by the prior art.

What is claimed is:

1. A trailer comprising,
   a trailer frame,
   a wheel assembly at each side of the trailer frame,
   each wheel assembly including a wheel and movable support means connected to the frame for mounting the wheel assembly on the frame for movement between an extended towing position for traveling with its wheel on a road surface and a retracted position which permits the frame to rest on a supporting surface, wheel assembly locking means interconnecting the frame and each wheel assembly to positively lock each wheel assembly in its extended towing position,
   towing member receiving means carried by said frame for supporting a towing member in a towing position,
   a towing member movable in said receiving means to a towing position in which it is used to pull the trailer on said road surface when the wheel assemblies are locked in their towing positions, said towing member being movable relative to the receiving means to a non-towing position away from its towing position,
   actuation means carried by said frame for actuation of said wheel assembly locking means,
   means for interconnecting said actuation means to said towing member whereby movement of the towing member to said towing position after the wheel assemblies are in their extended positions automatically activates said wheel assembly locking means to lock the wheel assemblies in their extended positions,
   manually actuatable means on said trailer for a human operator to move said interconnecting means to selectably manually operate said actuation means to selectably unlock said locking means at any operator-selected time after the towing member is moved away from its towing position to a non-towing position, apparatus means on said trailer for preventing manual operation of said manually actuatable means to prevent such selectable unlocking of said wheel assembly locking means while said towing member is in its towing position and until after an operator selectable time after the towing member is moved away from its towing position to a non-towing position,
   whereby said trailer can be towed when its wheel assemblies are locked in their extended positions by the towing member in its towing position and may rest upon a supporting surface by unlocking and retracting all wheel assemblies after the towing member is moved away from its towing position.

2. The trailer of claim 1 wherein said towing member receiving means includes a receptacle, and wherein further said towing member is elongated and sized and constructed to enter said receptacle and slide longitudinally therein to and from its towing position.

3. The trailer of claim 2 wherein said wheel assembly locking means is activated or made selectably releasable, respectively, by insertion and removal of said towing member into or from said towing member receiving receptacle in said frame.

4. The trailer of claim 2 wherein means are provided for releasably locking said towing member in said towing position within said towing member receptacle.

5. The trailer of claim 4 including means to disable said means for locking the towing member in said towing position within the receptacle to prevent the towing member from being locked in said towing position within said receptacle when said wheel assemblies are not fully extended.

6. The trailer of claim 2 wherein said wheel assembly locking means is activated to lock the wheel assemblies in their fully extended positions by sliding movement of said towing member to its towing position within said towing member receiving receptacle in said frame.

7. The trailer of claim 6 including, means for releasably locking said towing member in said towing position within said towing member receptacle, means to disable said means for locking the towing member within the receptacle to prevent the towing member from being locked within said receptacle in the towing position when said wheel assemblies are not fully extended.

8. The trailer of claim 1 wherein said means for locking wheel assemblies includes means to maintain locking of the wheel assemblies in their extended positions until frame weight is removed from said wheel assemblies.

9. The trailer of claim 1 wherein said manually actuatable means includes a manually operated mechanical control to operate said actuation means to selectably deactivate said wheel locking means once said towing member is moved from its towing position.

10. The trailer of claim 1 wherein the trailer frame has a periphery extending horizontally beyond the area of the wheel assemblies and said actuation means for locking wheel assemblies includes a manually operated control at the periphery of the trailer frame to deactivate said wheel locking means once said towing member is moved from its towing position.

11. The trailer of claim 1 wherein said wheel assemblies are retracted into said trailer to enable the trailer frame to rest on the supporting surface, the trailer including power means to effect relative movement between the frame and the wheel assemblies when the wheel assemblies are unlocked.

12. The trailer of claim 1 wherein said trailer further includes means for lowering and raising said frame to allow it to rest upon a surface or to be raised from a surface to allow extension and retraction of said wheel assemblies.

13. The trailer of claim 12 wherein said means for lowering and raising said frame includes one or more jack mechanisms.

14. The trailer of claim 12 wherein said means for lowering and raising said frame includes means to extend and retract said wheel assemblies relative to the frame.

15. A trailer according to claim 14 wherein the means to extend and retract said wheel assemblies relative to the frame includes means for applying a controlled force between the wheel assemblies and said frame.

16. the trailer of claim 1 wherein said frame further includes mechanical means for lowering and raising said frame to allow it to rest upon a surface with the wheel assemblies retracted or to be raised from a surface for extension of said wheel assemblies to their extended positions.

17. The trailer of claim 16 wherein said means for lowering and raising said frame includes one or more jack mechanisms.

18. The trailer of claim 17 wherein said means for locking the wheel assemblies includes means to maintain locking of the wheel assemblies in their extended positions until after frame weight is removed from said wheel assemblies by said jack mechanisms.

* * * * *